June 19, 1962 J. M. HUNT 3,039,694

FOUR QUADRANT MULTIPLIER

Filed Nov. 19, 1958 2 Sheets-Sheet 1

INVENTOR
JOHN M. HUNT
BY Harvey [signature]
ATTORNEY

FOUR QUADRANT MULTIPLIER

Filed Nov. 19, 1958 2 Sheets-Sheet 2

INVENTOR
JOHN M. HUNT
BY Harvey G. Lowhurst
ATTORNEY 3,039,694
Patented June 19, 1962

3,039,694

FOUR QUADRANT MULTIPLIER

John M. Hunt, Palo Alto, Calif., assignor to General Precision, Inc., a corporation of Delaware Filed Nov. 19, 1958, Ser. No. 774,992
5 Claims. (Cl. 235—194)

This invention relates to analog computer devices, and more particularly to a multiplier useful for deriving the product of several variables in four-quadrant operation.

In the analog computer, automatic control and instrumentation arts, much apparatus involves circuitry designed to multiply computer quantities, and considerable effort has been expended on the design and development of circuits which will provide an output voltage varying in accordance with the product of two independently varying input voltages. A number of analog computer devices for deriving such products have been developed in which the area of electric pulses, that is the time interval of the electrical signal, has been varied by varying pulse height and width, pulse slope and width, or pulse phase. These pulses are then filtered or integrated to provide an output voltage which varies as the product of the two variables in accordance with which the two pulse parameters have been varied.

Analog computer devices of these types are known in the art generally as time-division multipliers and have been found most useful where accuracies better than 0.2 percent at frequencies of the variables as high as 100 to 1,000 cycles are desired. Several different types of time-division multipliers are discussed in section 6.4 of the second edition of "Electric Analog Computers" by Korn and Korn, McGraw-Hill, New York (1956). Such multipliers require elaborate precision electronic switching and gate generator circuits which are costly. Also, such circuits do not lend themselves to sharing between several multipliers and consequently must be repeated for each multiplier in an analog computer system.

It is then an object of this invention to provide a new and novel analog computer device suitable for obtaining the product of two independent variables in four-quadrant operation.

It is a further object of this invention to provide a multiplier having a high accuracy without the necessity of complex circuitry required by prior art devices.

It is still a further object of this invention to provide an analog computer device which may share its associated carrier signal source with other devices of like kind so that the carrier signal source does not have to be repeated for each multplier.

It is still another object of this invention to provide a new and improved multiplier which combines economy with accuracy and reliability.

Other objects of the invention will in part be obvious and will in part appear hereinafter.

Figure 1:
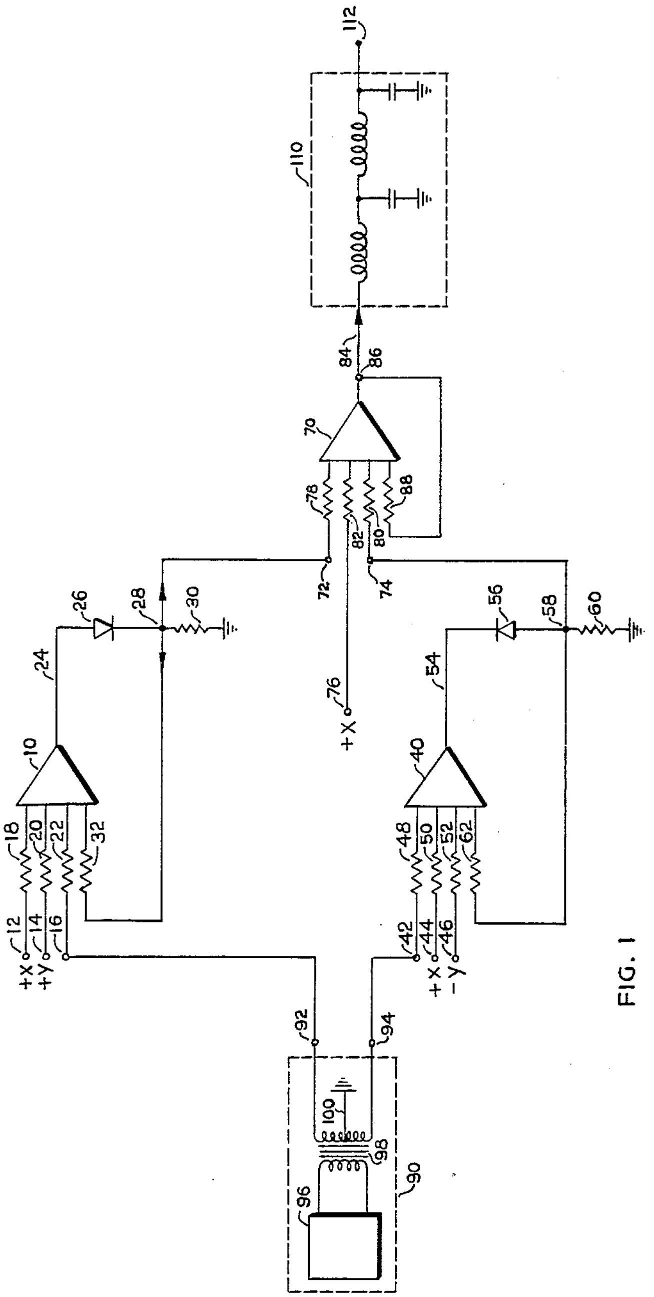
Figure 2A:
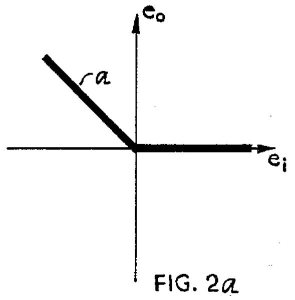
Figure 2B:
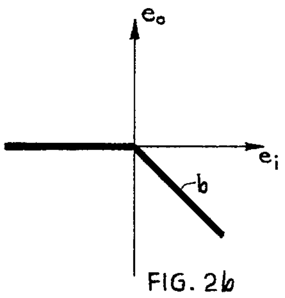
Figure 3:
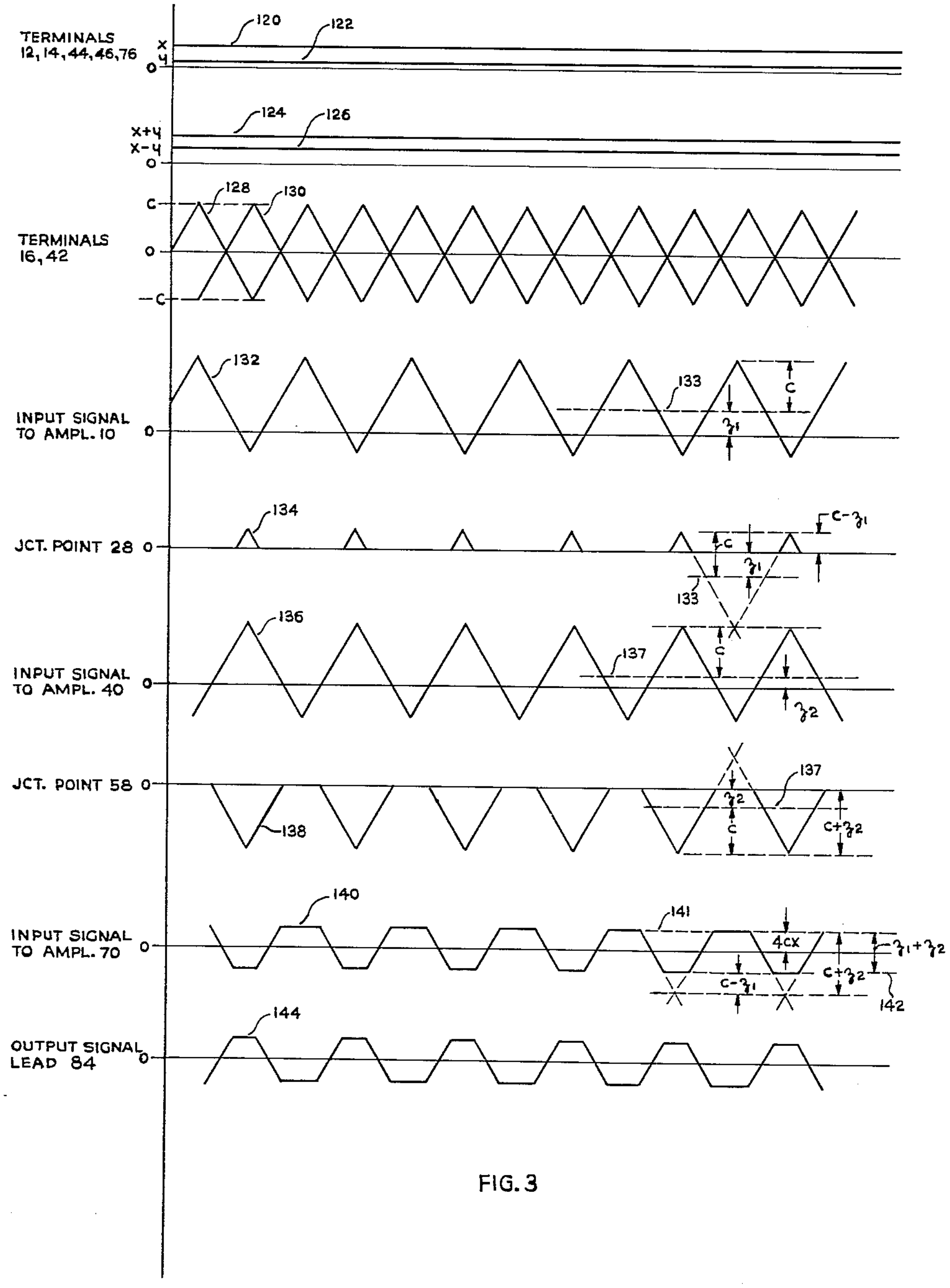

For a fuller understanding of the nature and objects of the invention, reference should be had to the following description taken in connection with the accompanying drawings, in which:

FIGURE 1 shows a schematic circuit diagram, partly in block form, of the analog computer device of this invention;

FIGURES 2*a* and 2*b* each show a graph in Cartesian coordinates illustrating the relationship between the input and output signals of the two diode limiting amplifiers included in the circuit diagram of FIGURE 1; and FIGURE 3 shows a series of curves illustrating signal variations and waveforms occurring at various designated points in the circuit of FIGURE 1. These wave shapes are drawn to a comon amplitude and time scale so that the wave shapes appearing at the various positions of the circuit at a given instant may be readily combined.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of my invention.

Referring now to the drawings, and particularly to FIGURE 1 thereof, a first amplifier shown in block form and designated by reference character 10 is provided with three input terminals 12, 14 and 16 connected thereto through three suming resistances 18, 20 and 22. Amplifier 10 is also provided with an output lead 24 connected to the plate of a diode 26. The cathode of diode 26 connects to a terminal 28 which, in turn, is grounded through a resistance 30 and which is also connected through a feedback resistance 32 to the input portion of amplifier 10.

Similarly, a second amplifier shown in block form and designated by reference character 40 is provided with three input terminals 42, 44 and 46 connected thereto through summing resistances 48, 50 and 52. Output lead 54 from amplifier 40 is connected to the cathode of a diode 56 whose plate is coupled via a terminal 58 and a resistance 60 to ground. Terminal 58 is also connected through feedback resistance 62 to the input portion of amplifier 40.

A third amplifier shown in block form and designated by reference character 70 is likewise provided with three input terminals 72, 74 and 76 which are connected thereto through summing resistances 78, 80 and 82. Amplifier 70 is provided with an output lead 84 to which a conventional feedback path is connected at a junction 86. The feedback path includes a conventional feedback resistance 88.

A signal source, shown in broken line block form and designated by reference character 90, has its two ouput terminals 92 and 94 connected to input terminals 16 and 42 respectively. As will become clearer in connection with the explanation of the operation of the analog computer device of this invention, source 90 may include a conventional signal generator 96 supplying a signal having a triangular or a sawtooth wave shape. The output signal from generator 96 may be applied to a first winding of a transformer 98 and terminals 92 and 94 are respectively connected to the ends of a second winding of transformer 98. The second winding may be grounded at its center by a grounding lead 100 if the phase difference between the signals applied to terminals 92 and 94 is to be 180 degrees. It is to be understood, however, that source 90 is merely shown by way of example and may be replaced by two separate and unrelated sources, each source providing a separate carrier signal to terminals 16 and 42 respectively. The only requirement, as will become clearer in connection with the explanation of the theory of operation of this invention, is that the peak amplitude of the signals (henceforth referred to as the carrier signal) applied to terminals 16 and 42 must be aqual if resistances 22 and 48 are equal.

Output lead 84 may be applied to a conventional filter such as the one shown in broken line block form and designated by reference character 110, or any other conventional filter or integrator which will provide an acceptably smooth output signal at terminal 112 from the signal on output lead 84.

Referring now to the operation of the analog computer device of FIGURE 1 and particularly to amplifiers 10 and 40, both are conventional, high gain, inverting amplifiers, that is amplifiers whose output is inverted in polarity from its input and whose gain, at least for direct current voltages, is of the order of a million or thereabout. The combination of resistances 18, 20 and 22 forms a summing means, and diode 26 together with feedback resistance 32 forms a feedback arrangement for amplifier 10. Similarly, the combination of resistances 48, 50 and 52 forms a summing means and diode 56 together with feedback resistance 62 forms a feedback arrangement for amplifier 40.

It should now be obvious to those skilled in the art that each amplifier 10, 40, with its input summing means and its feedback arrangement, is a type of "preferred-polarity" summing amplifier, that is, an amplifier which acts like a conventional summing amplifier for input signals of one polarity and as a conventional limiting amplifier for input signals of the other polarity. If the algebraic sum of the signals applied to say terminals 12, 14 and 16 is positive, the output of amplifier 10 will be a negative signal, and since the cathode of diode 26 is grounded, that is being maintained at zero potential, no current will flow through diode 26. Consequently, junction 28 remains at zero potential. If the algebraic sum of the signals applied to terminals 12, 14 and 16 is negative in polarity, amplifier 10 will provide a positive output signal on output lead 24 and diode 26 will conduct. The current flowing through diode 26 will pass to ground via resistance 30 so that junction 28 will become positive. The signal existing at junction 28 is fed back through feedback resistance 32 to amplifier 10 so that the combination acts as a conventional summing amplifier. A similar analysis of the summing circuit and feedback arrangement associated with amplifier 40 will show that for negative input signals the amplifier limits and for positive input signals the amplifier will behave as a summing amplifier.

FIGURES 2*a* and 2*b* respectively show the characteristics of amplifiers 10 and 40, with their respective feedback arrangements, in Cartesian coordinates in which the abscissa represents the sum of all externally applied signals designated as $e_i$ and in which the ordinate represents the output signal, designated $e_o$, at junctions 28 and 58, FIGURE 1, respectively. Curve *a*, FIGURE 2*a* shows that for negative input voltages $e_i$ applied to amplifier 10, the output voltage $e_o$ is positive and directly proportional to $e_i$, and for positive input voltages $e_i$ the output voltage $e_o$ remains zero. Similarly curve *b*, FIGURE 2*b* shows that for positive input voltages $e_i$ applied to amplifier 40, the output voltage is negative and directly proportional to $e_i$, and for negative input voltages, the output voltage $e_o$ remains zero.

Diodes 26 and 56 may be of the thermionic type, in which case a filament supply is required, or of the semiconductor type, in which case no filament supply is required. However, crystal diodes tend to pass appreciable reverse currents when the inverse voltages are very high. It has been found that high-vacuum diodes or high quality silicon-junction diodes (such as type 1N218), rather than point-contact diodes are preferred as diodes in the feedback arrangement shown in FIGURE 1.

Referring now more particularly to the operation of the device of FIGURE 1, the series of curves shown in FIGURE 3 will be utilized in explanation. An electrical signal *x*, commensurate with a first independent variable, is applied to terminals 12, 44 and 76 of the different summing means. Similarly, an electrical signal *y*, commensurate with a second independent variable, is applied to terminal 14 and an electrical signal $-y$, which is equal in magnitude but of opposite polarity to *y*, is applied to terminal 46. Both signals *x* and *y*, shown respectively as curves 120 and 122, FIGURE 3, may be continuously variable voltages representing some physical or mathematical relations and may be derived by conventional methods well known to those skilled in the art of analog computers. The sum and the difference between the *x* and *y* signals are graphically shown by curves 124 and 126 and are physically provided by the summing resistances 18, 20 and 50, 52 respectively.

Source 90, as has been stated herebefore, applies a carrier signal of triangular wave shape and peak amplitude equal to *c* to terminal 16. Curve 128, FIGURE 3, is a scale representation of this carrier signal. Summing means comprising resistances 18, 20 and 22 derives the algebraic sum of curve 124 and 128 as shown by curve 132, which is a first sum signal. The first sum signal may be looked upon as a signal represented by curve 128 and an offset signal $z_1=x+y$ as indicated by line 133, the zero level of curve 128. The output signal at junction point 28 of amplifier 10, is of course, equal to that portion of curve 132 which is of negative polarity in accordance with the explanation of FIGURE 2*a*. Curve 134 shows a graphical representation of the output signal at junction 28, which has a peak amplitude equal to $c-z$.

Source 90 also applies a carrier signal of peak amplitude equal to c to terminal 42 as shown by curve 130. Summing means comprising resistances 48, 50 and 52 derives the algebraic sum of curves 126 and 130 as shown by curve 136, which is a second sum signal. The second sum signal may be regarded as a combination of a carrier signal and an offset signal $z_2=2c-y$ as indicated by line 135 representing the zero level line of curve 130. The output signal at junction point 58 of amplifier 40 is equal to a signal representative of the portion of curve 136 lying above the base line i.e. the positive portion of curve 136. Curve 138 shows a graphical representation of the output signal at junction 58, which has a peak amplitude equal to $c+z_2$.

If a signal *x* is then applied to terminal 76, summing means comprising resistances 78, 80 and 82 will algebraically add up the signals represented by curves 134, 138 and 120. As will be made clearer hereinbelow in connection with an explanation of the theory of the operation of the device of FIGURE 1, resistance 82 is selected of such a value that it multiplies signal *x* by a factor $4c$, where *c* is equal to the peak value of the carrier signal. Consequently, curve 120 must be scaled appropriately prior to arriving at the proper graphical representation of the input signal to amplifier 70. Curve 140 is the graphical representation of this input signal. The construction details included in curve 140, FIGURE 3, make this easy to visualize. Line 141 is the former zero level line of curve 138. Line 142 is the new negative peak value obtained by removing from curve 138 a triangle in accordance with curve 134. In other words, the peak value of one input signal (curve 138) is equal to $c+z_2$ to which the other input signal (curve 134) equal to $c-z_1$, must be added. Since the two signals are of opposite polarity, the amplitudes are subtracted, i.e. $(c-z_1)-(c+z_2)=-(z_1+z_2)$. Consequently the input signal to amplifier 70 is negative and the addition of an offset voltage $4cx$ will provide the trapezoidal signal shown as curve 140, FIGURE 3. The output signal from amplifier 70 and appearing on lead 84 is graphically represented by curve 144, which is identical to curve 140 except reversed in polarity.

Referring now to the theory of operation, reference is made to the output voltages of amplifiers 10 and 40 represented by curves 134 and 138 respectively. The area of a triangle is proportional to height x base. But since the base therein is a function of the height, the area is also proportional to the square of the height. Let $A_1$ be the area of a triangle of curve 134 and $A_2$ the area of a triangle of curve 138. Then:

$$A_1=k(c-z_1)^2$$
$$A_2=k(c+z_2)^2$$

where *k* is a constant of proportionality. The difference between $A_2$ and $A_1$ is given as $$\Delta A=A_1-A_2=k[(c-z_1)^2-(c+z_2)^2]$$
$$=-k[2c(z_1+z_2)+z_2^2-z_1^2]$$

substituting for $z_1=x+y$ and $z_2=x-y$, the difference between the areas reduces to $$\Delta A=k(4xy-4cx)$$

or $$\frac{A_1-A_2}{k}-4cx=4xy$$

It can therefore be seen from this last equation that the computer device of this invention provides the product of two independent variables at output lead 84.

From the foregoing theory of operation it is immediately apparent that the peak carrier signal amplitude $c$ must at least be equal to the sum of the absolute magnitude of the $x$ and $y$ signals which are to be multiplied in order for the multiplier to function properly. If the $x$ signal varies, for example, between the limits of +12 volts and the $y$ signal varies between the limits of +18 and −12 volts, the peak amplitude $c$ of the carrier signal must be at least 40 volts, that is 80 volts peak to peak. It is also immediately apparent that the phase relation between the two carrier signals applied respectively to terminals 16 and 42, is of no consequence. The two carrier signals may be out-of-phase, or in phase, or may be displaced from one another by an arbitrary phase angle. If the two carrier signals are out-of-phase with one another, as shown in the illustrative drawings, the output signal of amplifier 70 is a signal having a regular trapezoidal wave shape. Since the output signal in most instances is to be filtered to obtain a direct current output voltage, an output signal having a regular trapezoidal wave shape is to be preferred, since its fundamental frequency is higher than an output signal obtained with the aid of two carrier signals having any other phase relationship therebetween. It is well known to those skilled in the art that the higher the frequency of the lowest frequency component of the signal to be filtered, the easier it is to design an efficient filter therefor. It is to be understood, however, that carrier signals having any arbitarary phase relationship therebetween will provide the desired result.

The frequency of the carrier signals is likewise of no importance; in fact it can easily be shown that the two carrier signals can be of entirely different frequencies. As a practical matter, however, the frequency response of conventional operational amplifiers should be considered. It has been found that conventional operational amplifiers can be readily employed when the frequency of the carrier signal is below say 300 cycles per second. Of course, as has been pointed out above, a low frequency fundamental is desired for the output signal amplifier 70. Consequently, carrier signals having the same frequency of the order of about 200 cycles per second are preferred. Much higher frequencies may be employed if more sophisticated amplifiers are used or if modest reduction in accuracy can be tolerated.

It is also apparent from the theory of operation that the correction term $4cx$ is dependent on the amplitude $c$ of the carrier signal and that, in consequence thereof, care should be exercised for accurate multiplication and the peak amplitude $c$ of the carrier signal should remain constant. Such a requirement is not burdensome since any one of a number of well-known automatic volume control methods can be employed to keep the carrier signal at a constant level.

Further, even though a carrier signal of triangular waveform has been selected to describe an exemplary computer device in accordance with this invention, it is obvious from the theory of operation that the carrier signals of various waveforms may be substituted therefor. For example, carrier signals having sawtooth or trapezoidal shape waveforms are suitable since their area can always be expressed in terms of the square of the height at a constant of proportionality. It may also be shown by a rigorous analysis that the carrier signals are not required to have the same waveforms at all, but one waveform may be triangular while the other may be of the sawtooth type. In summation it may be stated that the only requirement imposed upon the two carrier signals is that they have the same peak amplitude $c$ and exhibit a linear voltage-time relationship. Except for this requirement, the two carrier signals may have differently shaped waveforms, may be of different frequency and may have any phase relationship therebetween.

Since the carrier signal source is not in actual cooperation with the computer device of this invention but merely furnishes a carrier signal thereto, it may be utilized in connection with a large number of computer devices of the kind herein described. A single carrier signal source may be provided in connection with a large analog computer which includes many multipliers to which it furnishes the necessary carrier signals.

There has been described an analog computed device of the multiplier type which is suitable to provide the product of a first and a second variable by utilizing two limiting summing amplifiers and one conventional summing amplifier together with an external carrier signal source.

Although the inventin has been described with a certain degree of particularity, it is understood that the present disclosure has been made only by way of example and that numerous changes in the details of construction and combination and arrangement of parts may be resorted to without departing from the spirit and the scope of the invention as hereafter claimed.

What is claimed is:

1. Electronic means for generating a function comprising: a first summing amplifier for receiving a first input signal and including a first feedback circuit means, said first feedback circuit means being arranged to conduct only when said first input signal applied to said first amplifier is negative in sign with respect to a predetermined reference voltage; a second summing amplifier for receiving a second input signal and including a second feedback circuit means, said second feedback circuit means being arranged to conduct only when said second input signal applied to said second amplifier is positive in sign with respect to said reference voltage; and a direct-coupled negative feedback summing amplifier having input terminals, a different one of said input terminals being coupled to said first and said second feedback circuit means.

2. Electronic means for generating a function comprising: a first summing amplifier; a first feedback arrangement on said first amplifier incorporating a feedback resistor, a first diode serially connected to the first feedback arrangement, the plate of said diode means being connected to the output circuit of said first amplifier; a second summing amplifier; a second feedback arrangement on said second amplifier incorporating a feedback resistor, a second diode serially connected to the second feedback arrangement, the cathode of said second diode means being connected to the output circuit of said second amplifier; and a direct-coupled negative feedback summing amplifier having at least first and second input terminals, said first input terminal being connected to the cathode of said first diode means and said second input terminal being connected to the plate of said second diode means.

3. Electronic means for generating a function comprising: a first summing circuit; a first amplifier includat least an input and an output terminal, said first summing circuit being connected to said input terminal of said first amplifier; a first feedback arrangement on said first amplifier incorporating a feedback resistor, a first diode serially connected to the first feedback arrangement, the plate of said diode means being connected to said output terminal of said first amplifier; a second summing circuit; a second amplifier including at least an input and an output terminal, said second summing means being connected to said input terminal of said second amplifier; a second feedback arrangement on said second amplifier incorporating a feedback resistor, a second diode serially connected to the second feedback arrangement, the cathode of said second diode means being connected to said output terminal of said second amplifier; and a direct-coupled negative feedback summing amplifier having at least a first and a second input terminal, said first input terminal being connected to the cathode of said first diode means and the second terminal being connected to the plate of said second diode means 4. Electronic means for generating a function commensurate with the product of a first and a second variable and comprising: first summing means for deriving a first output signal equal to the combination of a carrier signal and a signal commensurate with the sum of said first and second variable; a first amplifier responsive to said first output signal; a first feedback arrangement on said first amplifier incorporating a feedback resistor, a first diode serially connected to the first feedback arrangement, the plate of said diode being connected to the output of said first amplifier; second summing means for deriving a second output signal equal to the combination of a carrier signal and a signal commensurate with the difference of said first and second variable; a second amplifier responsive to said second output signal; a second feedback arrangement on said second amplifier incorporating a feedback resistor, a second diode serially connected to the first feedback arrangement, the cathode of said second diode being connected to the output of said second amplifier; and a direct-coupled negative feedback summing amplifier responsive to the signal developed at the cathode of said first diode, the signal developed at the plate of said second diode and a signal commensurate with said first variable, said last mentioned amplifier thereby being operative to provide a signal commensurate with said product of said first and second variable.

5. Electronic means for generating a function commensurate with the product of a first and a second variable and comprising: first summing means for deriving a first sum signal proportional to the combination of a first carrier signal and a signal commensurate with the sum of said first and second variable; first amplifier circuit means responsive to said first sum signal and operative to provide a first output signal commensurate with the negative portion of said first sum signal; second summing means for deriving a second sum signal proportional to the combination of a second carrier signal and a signal commensurate with the difference of said first and second variable; second amplifier circuit means responsive to said second sum signal and operative to provide a second output signal commensurate with the positive portion of said second sum signal; each amplifier circuit means having a unidirectional conduction device for passing as the output signal of the respective portion of the sum signal and having a feedback path coupled to the unidirectional conduction device for feeding back only the respective portion of the sum signal; and means responsive to said first and second sum signal and a further signal commensurate with said first variable and operative to provide a signal commensurate with the product of said first and second variable.

References Cited in the file of this patent

UNITED STATES PATENTS 2,952,408 Davis et al. ............ Sept. 13, 1960

OTHER REFERENCES

"A Wide Band Analogue Multiplier Using Crystal Diodes," (Fisher), December 1957, Electronic Engineer, pgs. 580–585 relied on.

"Triangular-Wave" (Myers et al.), August 1956, Electronics, pages 182–185 relied on.

"Lace" (part 2), Jones et al., August 1957, Electronic Engineering, pgs. 380–385 of interest.